United States Patent
Dadam et al.

(10) Patent No.: US 11,306,670 B1
(45) Date of Patent: Apr. 19, 2022

(54) SYSTEMS AND METHODS FOR RELATIVE HUMIDITY SENSOR DIAGNOSTICS

(71) Applicant: Ford Global Technologies, LLC, Dearborn, MI (US)

(72) Inventors: Sumanth Dadam, New Hudson, MI (US); Vinod Ravi, Canton, MI (US); Edward Doemer, Dearborn Heights, MI (US); Robert Jentz, Westland, MI (US); Adam Krach, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/140,529

(22) Filed: Jan. 4, 2021

(51) Int. Cl.
*F02D 41/00* (2006.01)
*F02M 26/47* (2016.01)

(52) U.S. Cl.
CPC ..... *F02D 41/0055* (2013.01); *F02D 41/0007* (2013.01); *F02D 41/0052* (2013.01); *F02M 26/47* (2016.02); *F02D 2200/0414* (2013.01); *F02D 2200/0418* (2013.01)

(58) Field of Classification Search
CPC ............. F02D 41/0055; F02D 41/0007; F02D 41/0052; F02D 2200/0418; F02D 2200/0414; F02M 26/47

USPC ............ 123/556, 198 D; 73/114.21, 114.32, 73/114.33, 114.34, 114.37; 701/103, 107, 701/108, 109
See application file for complete search history.

(56) References Cited

U.S. PATENT DOCUMENTS

| | | | |
|---|---|---|---|
| 6,983,730 B2 * | 1/2006 | Kuzuyama | F02M 26/01 123/294 |
| 9,074,548 B2 | 7/2015 | Surnilla et al. | |
| 9,389,198 B2 | 7/2016 | Pursifull et al. | |
| 9,618,470 B2 | 4/2017 | Uhrich et al. | |
| 9,803,590 B2 | 10/2017 | Pursifull et al. | |
| 9,828,949 B2 | 11/2017 | Surnilla et al. | |
| 10,054,070 B2 | 8/2018 | Dudar et al. | |
| 10,156,213 B2 | 12/2018 | Pursifull et al. | |
| 10,358,998 B2 | 7/2019 | Dudar et al. | |

* cited by examiner

*Primary Examiner* — Hai H Huynh
(74) *Attorney, Agent, or Firm* — Geoffrey Brumbaugh; McCoy Russell LLP (57) ABSTRACT

Methods and systems are provided for diagnosing a humidity sensor in an engine. In one example, a method may include heating intake air entering an intake passage of an engine using heat recirculated from an exhaust system of the engine. A response of the humidity sensor to the heating of the intake air may be used to assess an integrity of the humidity sensor.

20 Claims, 6 Drawing Sheets

SYSTEMS AND METHODS FOR RELATIVE HUMIDITY SENSOR DIAGNOSTICS

FIELD

The present description relates generally to methods and systems for diagnosing an integrity of a relative humidity sensor.

BACKGROUND/SUMMARY

Modern vehicles may be adapted with various technologies to improve engine performance while reducing emissions. As an example, exhaust gas recirculation (EGR) may be used to return at least a portion of exhaust gas from an exhaust manifold of the engine to the engine intake for re-combustion. Engine efficiency may be directly affected by an amount of the recirculated exhaust gas, thus maximizing EGR may be desirable. Various conditions may determine how much EGR can occur at the engine without causing rough idling, misfire, and/or stalling. One such condition is relative humidity.

Humidity may affect a specific heat and therefore combustion properties of a fuel or fuel mixture, causing variation in the amount of exhaust gas that can be combusted while maintaining stable engine operation. As such, optimization of EGR flow may depend on accurate monitoring of a humidity of intake air at the engine. For example, the humidity may be used as a correction factor for a calibrated amount of EGR flow. In instances where the humidity-based correction factor is inaccurate due to degradation of a humidity sensor, a fuel efficiency of the engine may be reduced and $NO_x$ and particulate emissions may rise. An onboard diagnostic method for determining an integrity of the humidity sensor may thereby decrease a likelihood of unstable operation in an engine configured with EGR by allowing early detection of degradation. Engine operation may be adjusted accordingly to maintain stable combustion.

Attempts to assess a status of the humidity sensor include leveraging a relationship between humidity and temperature. One example approach is shown by Pursifull et al. in U.S. Pat. No. 9,389,198. Therein, a response of a humidity sensor to intake air temperature may be used to evaluate an integrity of the humidity sensor. Under certain operating conditions, intake air temperature may remain relatively stable. An intrusive test may be conducted where the intake air is heated by a heater to increase the temperature to a predetermined value over a set duration of time. If the humidity reading increases with the rise in temperature, the humidity sensor is deemed intact and if the humidity reading does not change, degradation of the humidity sensor is indicated.

However, the inventors herein have recognized potential issues with such systems. As one example, heating the intake air using the heater may raise a temperature of charge air delivered to the engine due to a prolonged period of time for the heater to cool. The warmer charge air may adversely affect engine performance. Furthermore, implementation of an electric heater may draw on energy stored at a vehicle battery, thus reducing battery capacity for other operations.

In one example, the issues described above may be addressed by a method for heating intake air entering an intake passage of an engine using heat recirculated from an exhaust system of the engine to diagnose a status of a relative humidity (RH) sensor positioned in the intake passage. In this way, the status of the humidity sensor may be determined rapidly and over a large temperature differential to provide a robust assessment of the RH sensor.

As one example, the heat from the exhaust system may be extracted using a heat recirculation system, the heat recirculation system including a heat exchanger arranged in a path of intake air flow, upstream of the RH sensor, and at least one heat sink coupled to an exhaust device of the exhaust system. Heat from the exhaust system may be absorbed by the heat sink and circulated to the heat exchanger by a coolant. At the heat exchanger, the heat is transferred to the intake air via liquid-to-air heating. In one example, the heat sink includes a phase change material configured to store large quantities of heat upon transition from a first state to a second state. The heat is released during a reverse transition from the second state to the first state and the released heat enables rapid intake air heating and facilitate a large increase in intake air temperature. A response of the RH sensor to the change in intake air temperature may be used to evaluated a condition of the RH sensor. As such, degradation of the RH sensor may be reliably detected via an energy efficient method, allowing mitigating actions to be performed to maintain engine performance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
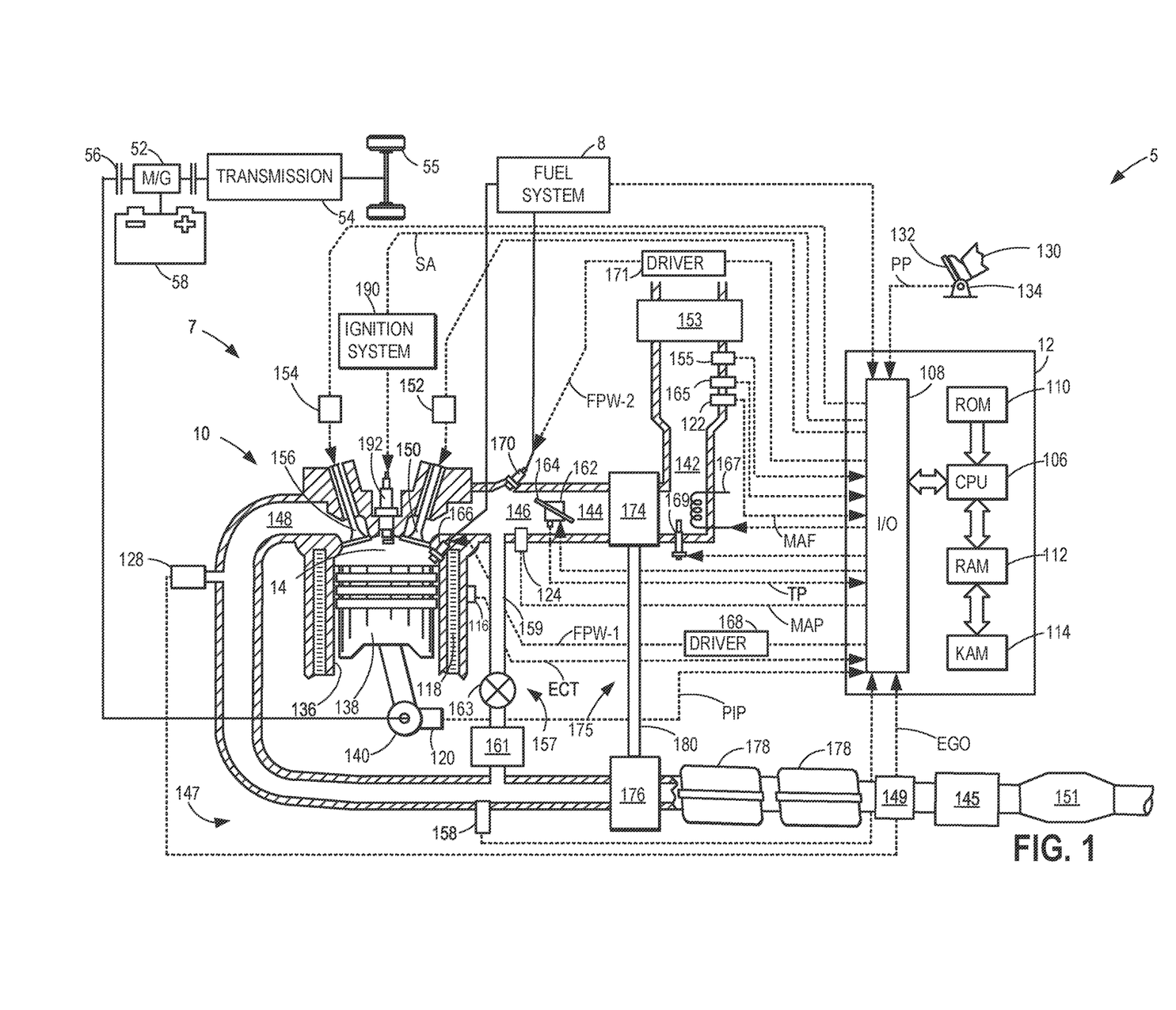
FIG. 1 shows an example of an engine system configured with a humidity sensor and a heat recirculation system, where the heat recirculation system may be used to test an integrity of a relative humidity (RH) sensor.
Figure 2:
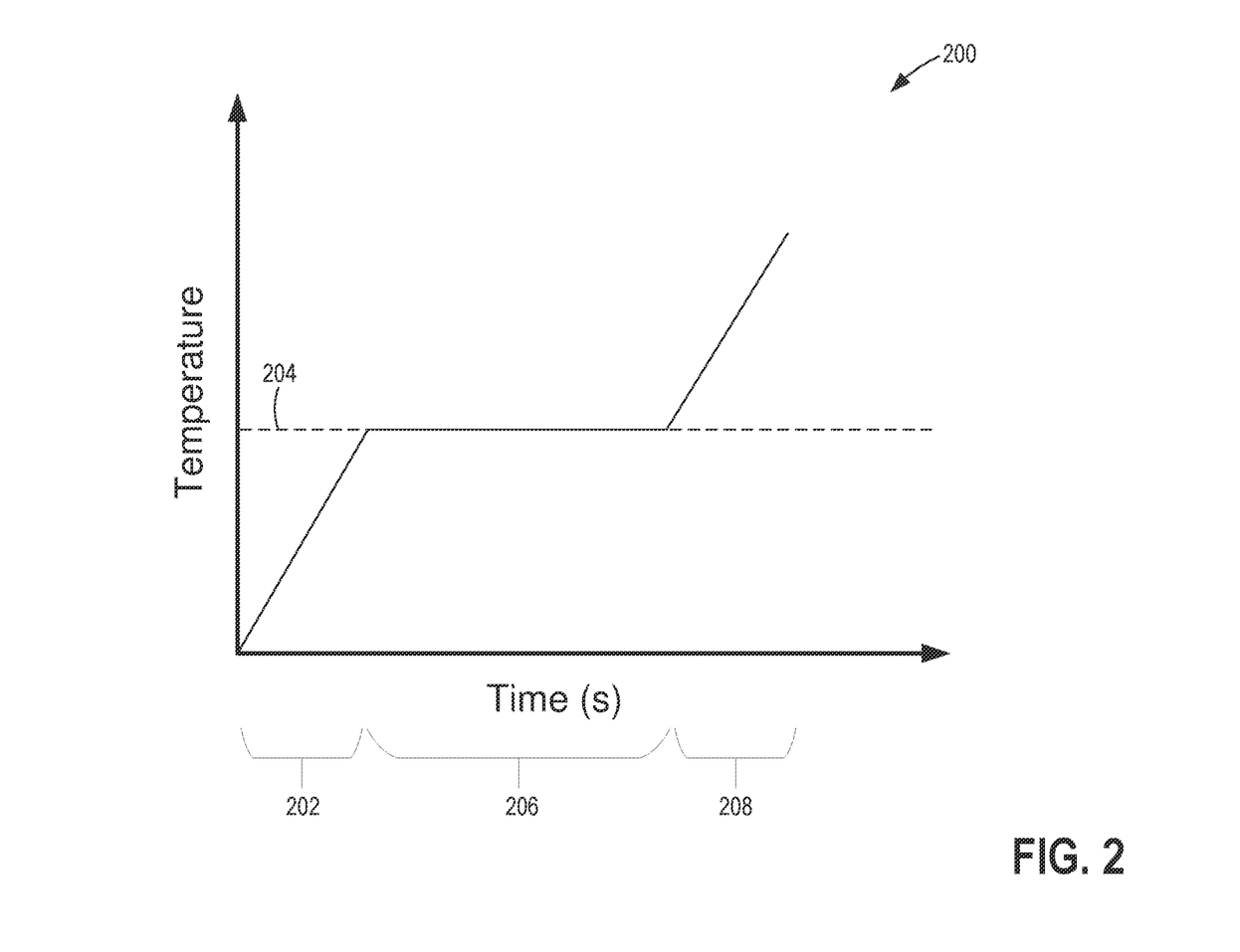
FIG. 2 shows a plot of temperature change at a phase change material which may be implemented in the heat recirculation system.
Figure 3:
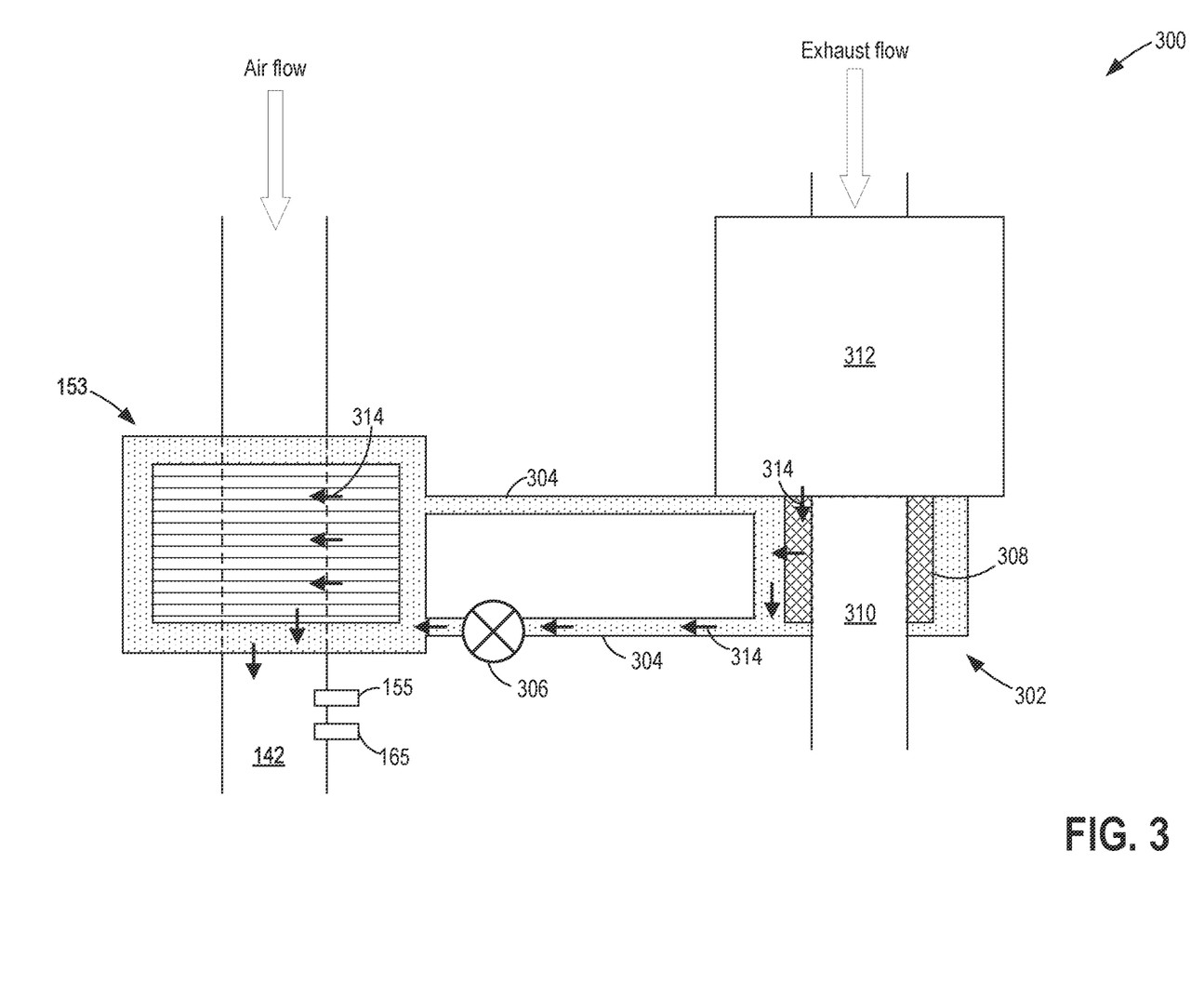
FIG. 3 shows a block diagram of the heat recirculation system.
Figure 5:
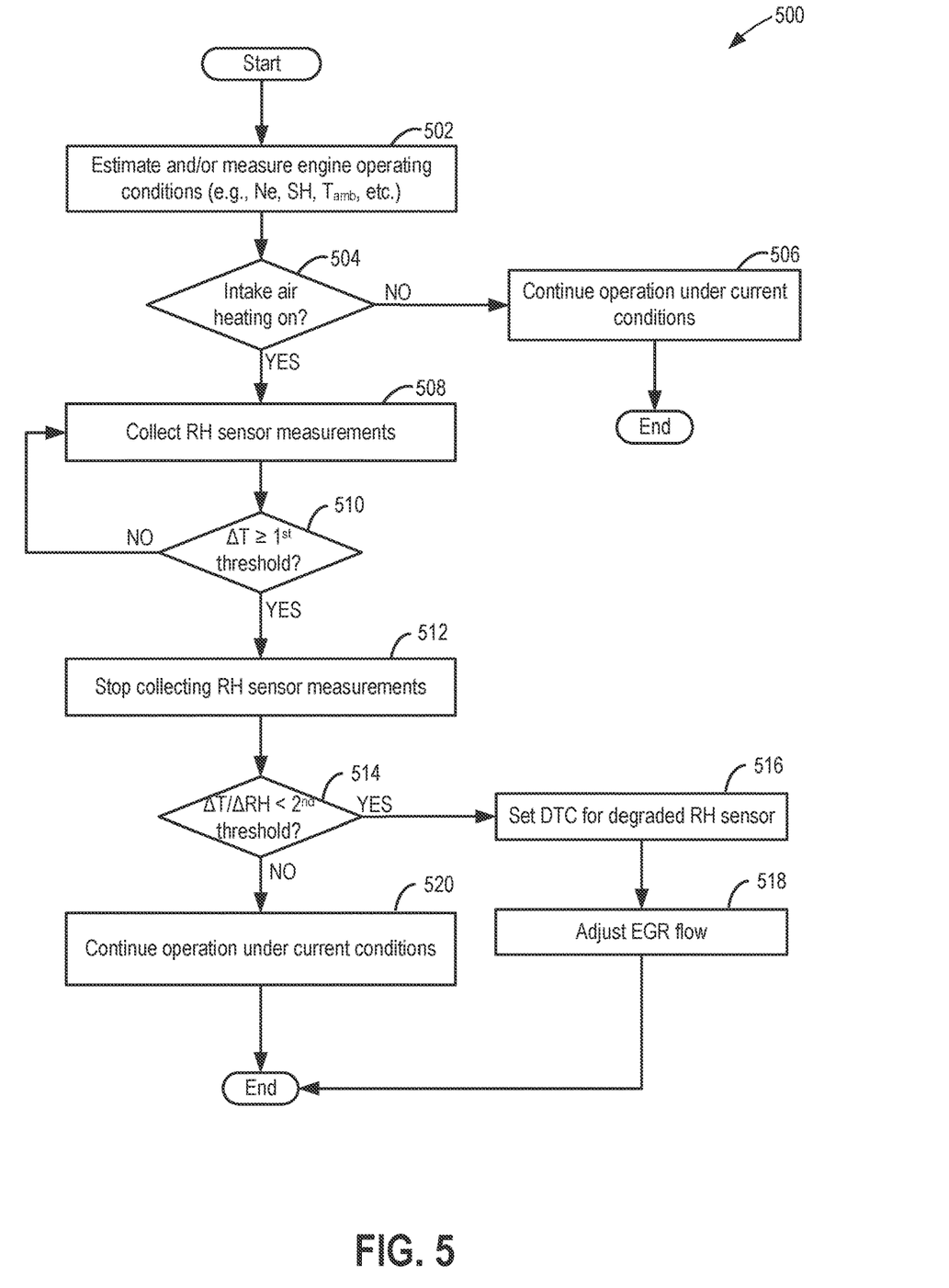
FIG. 5 shows an example of a non-intrusive method for assessing the status of the RH sensor.
Figure 6:
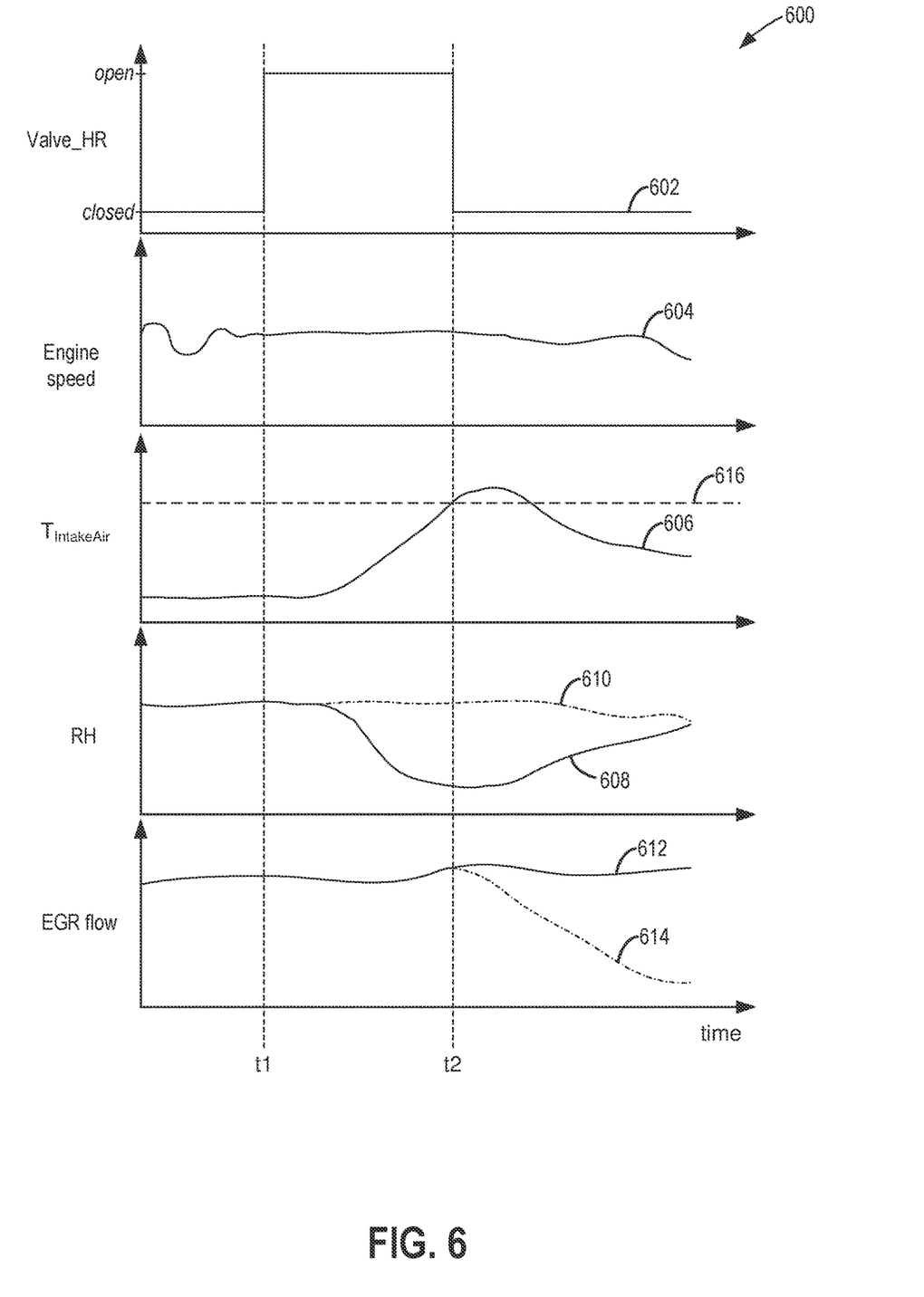
FIG. 6 shows exemplary engine operations and parameters during diagnosis of the RH sensor.

The following description relates to systems and methods for testing an integrity of a humidity sensor. The humidity sensor may be a relative humidity (RH) sensor installed in an intake passage of an engine system, as shown in FIG. 1. The RH sensor may be used as a correction factor in determining EGR flow in the engine system, thus accurate RH measurements are demanded for optimizing engine performance. A condition of the RH sensor may be determined based on an inverse relationship between RH readings and temperature. By increasing air temperature proximate to the RH sensor, degradation of the RH sensor may be detected based on a response of the RH sensor. In order to facilitate rapid heating of intake air with minimal adverse effect on charge air temperature, heating the intake air may include utilizing at least one heat sink in conjunction with a heat recirculation system where the heat sink is configured to absorb heat from an exhaust device. In one example, a phase change material (PCM) may be implemented in the heat sink to absorb and store heat during a phase transition, as shown in FIG. 2. The phase transition may be leveraged to extract heat from an exhaust system and deliver the extracted heat to an exhaust gas heat exchanger (EGHX) via a coolant to provide fast heating of the intake air. An example of the heat recirculation system, adapted with the PCM, is illustrated in FIG. 3. Examples of routines for heating the intake air to test the RH sensor are depicted in FIGS. 5 and 6, respectively, via intrusive and non-intrusive methods. Variations in engine operations and parameters occurring during testing of the RH sensor and subsequent diagnosis of the RH sensor are depicted in FIG. 6.

Turning now to FIG. 1, an example of a cylinder 14 of an internal combustion engine 10 is illustrated, which may be included in an engine system 7 of a vehicle 5. Engine 10 may be controlled at least partially by a control system, including a controller 12, and by input from a vehicle operator 130 via an input device 132. In this example, input device 132 includes an accelerator pedal and a pedal position sensor 134 for generating a proportional pedal position signal PP. Cylinder (herein, also "combustion chamber") 14 of engine 10 may include combustion chamber walls 136 with a piston 138 positioned therein. Piston 138 may be coupled to a crankshaft 140 so that reciprocating motion of the piston is translated into rotational motion of the crankshaft. Crankshaft 140 may be coupled to at least one drive wheel 55 of the passenger vehicle via a transmission 54, as described further below. Further, a starter motor (not shown) may be coupled to crankshaft 140 via a flywheel to enable a starting operation of engine 10.

In some examples, vehicle 5 may be a hybrid vehicle with multiple sources of torque available to one or more vehicle wheels 55. In other examples, vehicle 5 is a conventional vehicle with only an engine. In the example shown, vehicle 5 includes engine 10 and an electric machine 52. Electric machine 52 may be a motor or a motor/generator. Crankshaft 140 of engine 10 and electric machine 52 are connected via transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example, during a braking operation.

Cylinder 14 of engine 10 can receive intake air via an air induction system (AIS) including a series of intake passages 142, 144, and intake manifold 146. Intake manifold 146 can communicate with other cylinders of engine 10 in addition to cylinder 14, as shown in FIG. 2. In some examples, one or more of the intake passages may include a boosting device, such as a turbocharger or a supercharger. For example, FIG. 1 shows engine 10 configured with a turbocharger 175, including a compressor 174 arranged between intake passages 142 and 144 and an exhaust turbine 176 arranged along an exhaust manifold 148. Compressor 174 may be at least partially powered by exhaust turbine 176 via a shaft 180 when the boosting device is configured as a turbocharger. However, in other examples, such as when engine 10 is provided with a supercharger, compressor 174 may be powered by mechanical input from a motor or the engine and exhaust turbine 176 may be optionally omitted.

A throttle 162 including a throttle plate 164 may be provided in the engine intake passages for varying the flow rate and/or pressure of intake air provided to the engine cylinders. For example, throttle 162 may be positioned downstream of compressor 174, as shown in FIG. 1, or may be alternatively provided upstream of compressor 174.

An exhaust system 147 of engine system 7 is coupled to cylinder 14 and includes an exhaust manifold 148 and various exhaust devices arranged downstream of turbine 176. Exhaust manifold 148 can receive exhaust gases from other cylinders of engine 10 in addition to cylinder 14. An exhaust gas sensor 128 is shown coupled to exhaust manifold 148 upstream of exhaust devices such as emission control devices 178. Exhaust gas sensor 128 may be selected from among various suitable sensors for providing an indication of exhaust gas air/fuel ratio (AFR), such as a linear oxygen sensor or UEGO (universal or wide-range exhaust gas oxygen), a two-state oxygen sensor or EGO (as depicted), a HEGO (heated EGO), a NOx, a HC, or a CO sensor, for example. The emission control devices 178 may each be a three-way catalyst, a NOx trap, various other emission control devices, or combinations thereof.

The exhaust devices of exhaust system 147 may also include a particulate filter 149 downstream of the emission control devices 178 to remove particulate matter from the exhaust gas flowing through the exhaust system 147. The particulate filter 149 may be a gasoline particulate filter (GPF) when engine 10 is configured as a gasoline direct injection engine or a diesel particulate filter (DPF) when engine 10 is a diesel engine. An exhaust gas heat recovery (EGHR) unit 145 may be positioned between the particulate filter 149 and a muffler 151 in the exhaust system 147. The EGHR unit 145 may include a heat exchanger configured to exchange heat with engine coolant. For example, the EGHR unit 145 may divert exhaust gas either through the heat exchanger to warm the engine coolant or may be routed through a bypass so that the exhaust gas flows around the heat exchanger. In this way, waste heat may be recuperated to heat the engine coolant. The muffler 151, positioned downstream of the EGHR unit 145, may be configured to dampen noise produced during release of exhaust gas from cylinder 14.

The exhaust devices of the exhaust system 147 may absorb heat from exhaust gases flowing therethrough and/or generate heat during treatment of the gases. The heat, which may otherwise be wasted, may be extracted from the exhaust devices and redirected to other regions of engine 10 by a heat recirculation system. The heat recirculation system may include thermally coupling one or more of the exhaust devices to an EGHX 153. The EGHX 153 may be positioned at an area of engine system 7 where heating is desired, such as at intake passage 142. A coolant, such as water, may flow between the EGHX 153 and one or more heat sinks coupled to one or more of the exhaust devices, as shown in FIG. 3, allowing the coolant to absorb heat from the exhaust devices and transfer the heat to air flowing into intake passage 142. Further details of the heat recirculation system are described further below, with reference to FIG. 3.

In some examples, intake passage 142 may be optionally configured with an electrical device to heat the intake air entering intake passage 142. For example, as shown in FIG. 1, an intake air heater 167 may be arranged in intake passage 142, the intake air heater 167 actuatable based on instructions from controller 12. Additionally or alternatively, at least one glow plug 169 may be installed in intake passage 142 to heat the intake air upon activation as commanded by controller 12. In one example, use of the electrical device to increase a temperature of the intake air may be obviated by implementation of the heat recirculation system in conjunction with a PCM, as described further below.

The EGHX 153 may be positioned upstream of and in close proximity to a humidity sensor 155. In one example, the humidity sensor 155 may be a relative humidity (RH) sensor 155, configured to measure a ratio of a partial pressure of water vapor to an equilibrium vapor pressure of water at a given temperature. An intake air temperature (IAT) sensor 165 may be located near the RH sensor 155, as shown in FIG. 1. The RH is therefore dependent upon temperature, having an inverse relationship such that as temperature rises, RH decreases. The RH sensor 155 may measure the RH of intake air entering intake passage 142 and an amount of EGR flow delivered to engine 10 may be adjusted based on the RH measurement. For example, as shown in FIG. 1, engine 10 may be adapted with a high pressure EGR (HP-EGR) system 157, including an EGR passage 159 fluidically coupling exhaust manifold 148, upstream of turbine 176, to intake manifold 146, downstream of throttle 162.

An EGR cooler 161 may be arranged in EGR passage 159 to cool exhaust gases flowing from exhaust manifold 148 to intake manifold 146. An EGR valve 163 may be positioned downstream of the EGR cooler 161 to control flow through passage 159. An opening of the EGR valve 163 may be continuously adjustable between a fully open position and a closed position, thereby regulating a flow rate of HP-EGR delivered to cylinder 14 for re-combustion. The flow rate may be adjusted, at least in part, based on the RH measured at the RH sensor 155 to maintain stoichiometry and stable engine operation while combusting recirculated exhaust gas. As such, degradation of the RH sensor leading to inaccurate RH measurements may cause unstable combustion and misfire at cylinder 14. Thus a robust method for testing an integrity of the RH sensor is desirable and is described in detail further below.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder. Intake poppet valve 150 may be controlled by controller 12 via an actuator 152. Similarly, exhaust poppet valve 156 may be controlled by controller 12 via an actuator 154. The positions of intake poppet valve 150 and exhaust poppet valve 156 may be determined by respective valve position sensors (not shown).

During some conditions, controller 12 may vary the signals provided to actuators 152 and 154 to control the opening and closing of the respective intake and exhaust valves. The valve actuators may be of an electric valve actuation type, a cam actuation type, or a combination thereof. The intake and exhaust valve timing may be controlled concurrently, or any of a possibility of variable intake cam timing, variable exhaust cam timing, dual independent variable cam timing, or fixed cam timing may be used. Each cam actuation system may include one or more cams and may utilize one or more of cam profile switching (CPS), variable cam timing (VCT), variable valve timing (VVT), and/or variable valve lift (VVL) systems that may be operated by controller 12 to vary valve operation. For example, cylinder 14 may alternatively include an intake valve controlled via electric valve actuation and an exhaust valve controlled via cam actuation, including CPS and/or VCT. In other examples, the intake and exhaust valves may be controlled by a common valve actuator (or actuation system) or a variable valve timing actuator (or actuation system).

Cylinder 14 can have a compression ratio, which is a ratio of volumes when piston 138 is at bottom dead center (BDC) to top dead center (TDC). In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 for initiating combustion. An ignition system 190 can provide an ignition spark to combustion chamber 14 via spark plug 192 in response to a spark advance signal SA from controller 12, under select operating modes. A timing of signal SA may be adjusted based on engine operating conditions and driver torque demand. For example, spark may be provided at maximum brake torque (MBT) timing to maximize engine power and efficiency. Controller 12 may input engine operating conditions, including engine speed, engine load, and exhaust gas AFR, into a look-up table and output the corresponding MBT timing for the input engine operating conditions. In other examples the engine may ignite the charge by compression as in a diesel engine.

In some examples, each cylinder of engine 10 may be configured with one or more fuel injectors for providing fuel thereto. As a non-limiting example, cylinder 14 is shown including a fuel injector 166. Fuel injector 166 may be configured to deliver fuel received from a fuel system 8. Fuel system 8 may include one or more fuel tanks, fuel pumps, and fuel rails. Fuel injector 166 is shown coupled directly to cylinder 14 for injecting fuel directly therein in proportion to the pulse width of a signal FPW-1 received from controller 12 via an electronic driver 168. In this manner, fuel injector 166 provides what is known as direct injection (hereafter also referred to as "DI") of fuel into cylinder 14. While FIG. 1 shows fuel injector 166 positioned to one side of cylinder 14, fuel injector 166 may alternatively be located overhead of the piston, such as near the position of spark plug 192. Such a position may increase mixing and combustion when operating the engine with an alcohol-based fuel due to the lower volatility of some alcohol-based fuels. Alternatively, the injector may be located overhead and near the intake valve to increase mixing. Fuel may be delivered to fuel injector 166 from a fuel tank of fuel system 8 via a high pressure fuel pump and a fuel rail. Further, the fuel tank may have a pressure transducer providing a signal to controller 12.

Fuel injector 170 is shown arranged in intake manifold 146, rather than in cylinder 14, in a configuration that provides what is known as port fuel injection (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake poppet valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. Fuel injectors 166 and 170 may have different characteristics. These include differences in size, for example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

Controller 12 is shown in FIG. 1 as a microcomputer, including a microprocessor unit 106, input/output ports 108, an electronic storage medium for executable programs (e.g., executable instructions) and calibration values shown as non-transitory read-only memory chip 110 in this particular example, random access memory 112, keep alive memory 114, and a data bus. Controller 12 may receive various signals from sensors coupled to engine 10, including signals previously discussed and additionally including a measurement of inducted mass air flow (MAF) from a mass air flow sensor 122; an engine coolant temperature (ECT) from a temperature sensor 116 coupled to a cooling sleeve 118; an exhaust gas temperature from a temperature sensor 158 coupled to exhaust manifold 148; a profile ignition pickup signal (PIP) from a Hall effect sensor 120 (or other type) coupled to crankshaft 140; throttle position (TP) from a throttle position sensor; signal EGO from exhaust gas sensor 128, which may be used by controller 12 to determine the AFR of the exhaust gas; and an absolute manifold pressure signal (MAP) from a MAP sensor 124. An engine speed signal, RPM, may be generated by controller 12 from signal PIP. The manifold pressure signal MAP from MAP sensor 124 may be used to provide an indication of vacuum or pressure in the intake manifold 146. Controller 12 may infer an engine temperature based on the engine coolant temperature and infer a temperature of catalyst 178 based on the signal received from temperature sensor 158. Additional sensors providing data to controller 12 are shown in FIG. 2 and described further below.

Controller 12 receives signals from the various sensors of FIG. 1 and employs various actuators of FIG. 1 to adjust engine operation based on the received signals and instructions stored on a memory of the controller. For example, upon receiving a signal from the exhaust gas sensor 128 inferring the AFR of the air/fuel mixture combusted at the cylinder, the opening of the EGR valve 163 may be adjusted accordingly to modify the amount of EGR delivered to the cylinder.

As described above, FIG. 1 shows only one cylinder of a multi-cylinder engine. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

In addition, it will be appreciated that the configuration of engine system 7 shown in FIG. 1 is a non-limiting example. Other examples may include variations in positions of various components, such as a placement of the IAT sensor 165 relative to the RH sensor 155, a number and ordering of the exhaust devices, as well as locations of junctions along both exhaust manifold 148 and intake manifold 146 for the passage 159 of the HP-EGR system 157. Furthermore, in some examples, the EGR valve 163 may be located upstream of the EGR cooler 161 instead of downstream.

As described above, the amount of exhaust gas recirculated to the engine via HP-EGR may be adjusted based on RH of the intake air to optimize combustion at the engine. It may be desirable to at least periodically monitor an integrity of the RH sensor to allow early detection of sensor degradation. Verification of the RH sensor condition may be achieved by observing a response of the RH sensor to an increase in IAT. Relative humidity has an inverse relationship with temperature and therefore a decrease in the RH sensor measurements corresponding to rising temperatures indicates that the RH sensor is intact. However, if the RH sensor measurements do not change or increase as IAT rises, degradation of the sensor may be indicated.

Conventional methods for testing the RH sensor may include utilizing an intake air heater to heat the intake air near the RH sensor. However, use of the intake air heater may depend on the engine system being disposed with an intake air heater, such as in diesel engines, as aftermarket additions may be costly or difficult to incorporate into the engine configuration. Additionally, heating intake air using the intake air heater may cause charge air to become warmed due to a period of time for the heated intake passage to cool to ambient temperature. In some examples, the intake air heater may be powered by an energy storage device of the vehicle, such as the battery 58, thus increasing a burden on the battery.

As an alternative, at least one glow plug may be used to similarly heat the intake air in the intake passage. However, similar issues may arise with use of the glow plug, including electrical power consumption and prolonged cooling of the intake passage.

In one example, the heat recirculation system described above may be used to heat the intake air to enable testing of the RH sensor response. The heat recirculation system, which includes the EGHX and one or more heat sinks coupled to one or more exhaust devices, may utilize heat transfer between the one or more heat sinks and a circulating coolant to direct exhaust heat to other areas of the engine system. By positioning the EGHX at the intake passage of the engine system, e.g., intake passage 142, immediately upstream of the RH sensor, the exhaust heat may be routed to the intake passage to heat the intake air via liquid-to-air heat exchange. The EGHX may be fluidically coupled to the heat sinks by coolant lines, and by circulating the coolant between the EGHX and the heat sinks, waste heat may be harvested to warm intake air passing through the EGHX.

In order to provide robust testing of the RH sensor, monitoring the RH sensor over a large change in temperature may enable shorter testing times, thereby reducing effects of environmental noise, e.g., ambient changes in humidity, and allowing more accurate calibration of the sensor. Relying on heat transfer through the coolant alone, however, may not provide sufficient heat input to induce a sufficient temperature change. In one example, rapid intake air heating may be achieved by adapting the heat sink with a PCM. The PCM may be a material with a large latent heat that transitions between a first phase and a second phase at a target temperature range. During the phase transition, a large quantity of heat may be absorbed as the PCM is heated and undergoes a physical change, maintaining a relatively uniform temperature at the PCM until the phase transition is complete. Upon cooling, the absorbed heat is released, thus inducing a large temperature increase in materials proximate to or in contact with the PCM.

The PCM may have a greater latent heat than conventional materials used for heat storage and/or heat exchange. Thus, the PCM-adapted heat sink may be compact with a small footprint, allowing the heat sink to be added to the exhaust system without demanding restructuring or resizing of the exhaust system components. Furthermore, a variety of PCMs are available at low cost, enabling customization of thermal control according to a desired amount of heat to absorbed or supplied.

Temperature change at the PCM during heating is shown in FIG. 2 by a graph 200 of temperature relative to time. During a first heating phase 202, the PCM may be in a first phase and the temperature at the PCM increases according to a rate of heating. In one example, the first phase may be a solid phase. When the PCM temperature reaches a transition temperature 204, which may be a melting point temperature 204, the PCM temperature plateaus for a duration of time of a second heating phase 206. During the second heating phase 206, the PCM transitions from the first phase to a second phase, absorbing heat as the PCM gradually melts. The second phase, for example, may be a liquid phase. It will be noted that while the second heating phase 206 is depicted as a horizontal line for clarity, the temperature of the PCM may fluctuate by relatively small increments, such as 1-5% (e.g., by a few degrees).

The second heating phase 206 ends when the PCM is entirely in the second phase. The temperature at the PCM increases during a third heating phase 208, at a rate corresponding to the applied heating and a specific heat of the PCM in the second phase, which may be similar to or different from the heating rate during the first heating phase 202. When the PCM is cooled to below the transition temperature 204, subsequent to heating to or beyond the transition temperature 204, the PCM transitions from the second phase to the first phase, e.g., from liquid to solid. During this transition, the heat absorbed during the second heating phase 206 is released to the surroundings. The amount of heat absorbed/released is dependent on a latent heat of the PCM. Thus the PCM may be selected based on its transition temperature and latent heat to provide fast heat release which may be directed to an EGHX (e.g., the EGHX 153 of FIG. 1) to heat intake air and monitor a condition of a RH sensor.

For example, the PCM may be arranged in a heat sink coupled to an exhaust device of an exhaust system. The exhaust devices may be any of an emission control device, a particulate filter, an EGHR unit, and a muffler, as shown in FIG. 1. The heat sink may be arranged in contact with the exhaust device such that heat generated at the exhaust device is communicated to the heat sink. The heat sink may be configured as a heat exchanger and may be equipped with the PCM to absorb thermal energy from the exhaust device which is delivered to an EGHX by coolant, as shown in FIG. 3.

An example of a heat recirculation system 300 of a vehicle, such as vehicle 5 of FIG. 1, is illustrated in FIG. 3, and includes components introduced in FIG. 1. As described above, the EGHX 153 may provide liquid-to-air heating (or air-to-liquid cooling) by flowing a coolant through channels of the EGHX 153. For example, the EGHX 153 may include fins through which the coolant flows and heat is exchanged across surfaces of the fins. However, other heat exchanger configurations are possible.

The coolant may be circulated between the EGHX 153 and a heat sink 302 by coolant lines 304. A valve 306 may be arranged in one of the coolant lines 304 to control the flow of the coolant through the heat recirculation system 300. Coolant flowing through the heat sink 302 may flow across surfaces of a PCM 308 (denoted by crosshatching) implemented in the heat sink 302. In one example, the heat sink 302 may be arranged immediately downstream of an exhaust device 312 and circumferentially surround an exhaust passage 310 extending between an exhaust manifold (e.g., exhaust manifold 148 of FIG. 1) and a tail pipe of the vehicle. The exhaust device 312 may be any of an emission control device, a particulate filter, an EGHR unit, or a muffler.

By positioning the heat sink 302 downstream of the exhaust device and in contact with the exhaust device 312, heat generated at the exhaust device 312 may be conducted to the PCM 308, thereby heating the PCM 308. An overall transfer of heat through the heat recirculation system 300 is shown by arrows 314. The PCM 308 may be formed of a material with a transition temperature near or slightly above an operating temperature of the exhaust device 312. As the vehicle is driven and exhaust gas is generated, the valve 306 may be closed, blocking flow through the heat recirculation system 300. Heat from the exhaust device 312 is absorbed by the PCM 308, driving a transition from a first phase to a second phase (e.g., a forward phase transition). A temperature of the PCM 308, which may be transferred to the coolant surrounding the PCM 308 in the heat sink 302, may remain relatively uniform until the PCM 308 is completely converted to the second phase.

Most of the coolant in the heat recirculation system 300, distributed between the EGHX 153, the coolant lines 304, and the heat sink 302, may be distal to the PCM 308 (e.g., outside of the heat sink 302) when the valve 306 is closed and the coolant is stagnant. Thus, a large portion of a volume of the coolant is not heated by the PCM 308 when the valve 306 is closed and may be at a lower, ambient temperature, e.g., a temperature of the intake air flowing into intake passage 142. When heating of the intake air is desired for assessing a status of the RH sensor 155, the valve 306 may be opened, allowing the coolant to circulate through the heat recirculation system 300, where the flow may be driven by a pump, as an example.

As the coolant circulates, the coolant surrounding the PCM 308 may be replaced by cooler coolant, decreasing the temperature of the PCM 308. As the PCM 308 cools to below its transition temperature, the PCM 308 is converted, at least partially, from the second phase to the first phase (e.g., a reverse phase transition). At the PCM 308 transitions, the heat absorbed during the forward phase transition is released, expelling at large quantity of heat into the coolant. A temperature of the coolant rises quickly, resulting in rapid heating of the intake air at the EGHX 153.

When testing of the RH sensor 155 is complete, the valve 306 may be closed, halting the flow of coolant through the heat recirculation system 300. The stagnant coolant in the EGHX 153 may quickly cool as intake air flows across the EGHX 153. The fast cooling of the coolant may mitigate continued heating of the intake air which may otherwise cause warming of charge air delivered to the engine. Without coolant circulation, the coolant in the heat sink may warm and the PCM 308 may absorb heat from the exhaust device 312 and transition from the second phase to the first phase.

Although the heat sink 302 is shown in FIG. 3 as located downstream of the exhaust device 312, in other examples, the heat sink 302 may be positioned relative to the exhaust device 312 according to other configurations. For example, the heat sink 302 may instead circumferentially surround the exhaust device 312 with the PCM 308 arranged in the heat sink 302 such that the PCM 308 is biased toward a surface of the exhaust device 312. An arrangement of the heat sink 302 may be varied based on a type of exhaust device 312 to which it is coupled. For example, the heat sink 302 may be located downstream of a muffler due to a size of the muffler but may be wrapped around a device with a smaller footprint, such as a particulate filter.

In one example, when more than one heat sink is included in the exhaust system, each heat sink coupled to an exhaust device, the heat sinks may be continuously coupled to the EGHX in series via coolant lines. In another example, each heat sink may be individually coupled via the coolant lines, e.g., the heat sinks are connected to the EGHX in parallel.

As described above, a material of the PCM may be selected based on a similarity of the transition temperature of the material to an operating temperature of the exhaust device. Furthermore, the material may also be determined according to a latent heat of the material, a compatibility of the material with the coolant to reduce a likelihood of adverse reactions if mixing of the coolant with the PCM occurs. In some examples, different materials may be used according to the type of exhaust device to which the heat sink is coupled. Thus, a PCM with a suitable transition temperature may be customized to the operating temperature of the exhaust device type. In one example, the PCM may be formed of paraffin wax which has a melting temperature that varies based on a carbon chain length. Other PCMs which may be used to control heat exhaust heat distribution includes other organic compounds such as fatty acids, inorganic compounds, such as hydrated salts and metals, and eutectic mixtures.

In this way, a PCM may be used to rapidly heat intake air to test an integrity of a RH sensor. The testing may be conducted via an intrusive method or via a non-intrusive method. In the non-intrusive method, the RH sensor may be opportunistically evaluated when the intake air is heated during engine operation. For example, intake air may be heated during cold engine starts to expedite heating of the engine intake manifold, thereby circumventing fuel condensation in carbureted and throttle body injection systems. In other examples, increasing the temperature of the intake air may assist in homogenizing air/fuel mixtures for combustion to reduce engine emissions and fuel consumption, particularly under cold ambient conditions.

During the non-intrusive use case, the intake air may be heated by an intake air heater, e.g., the intake air heater 167 of FIG. 1, in one example. In another example, the intake air may be heated by one or more glow plugs, such as the glow plug 169 of FIG. 1. However, as both the intake air heater and the glow plugs are electrically powered and therefore contribute to energy consumption, it may be desirable to use a heat recirculation system such as the heat recirculation system shown in FIG. 3 to harvest waste exhaust heat to rapidly heat the intake air.

Alternatively, the intrusive method may be applied to heat the intake air during steady state driving conditions, such as freeway driving. By selectively heating the intake air during steady state driving conditions, a larger change in intake air temperature may be facilitated, allowing for more accurate calibration and shorter testing time, thus providing results more robust to environmental noise factors. During the intrusive method, the intake air may also be heated by any of the intake air heater, one or more glow plugs, or the heat recirculation system, where the heat recirculation system may provide more energy efficient and reliable results.

Figure 4:
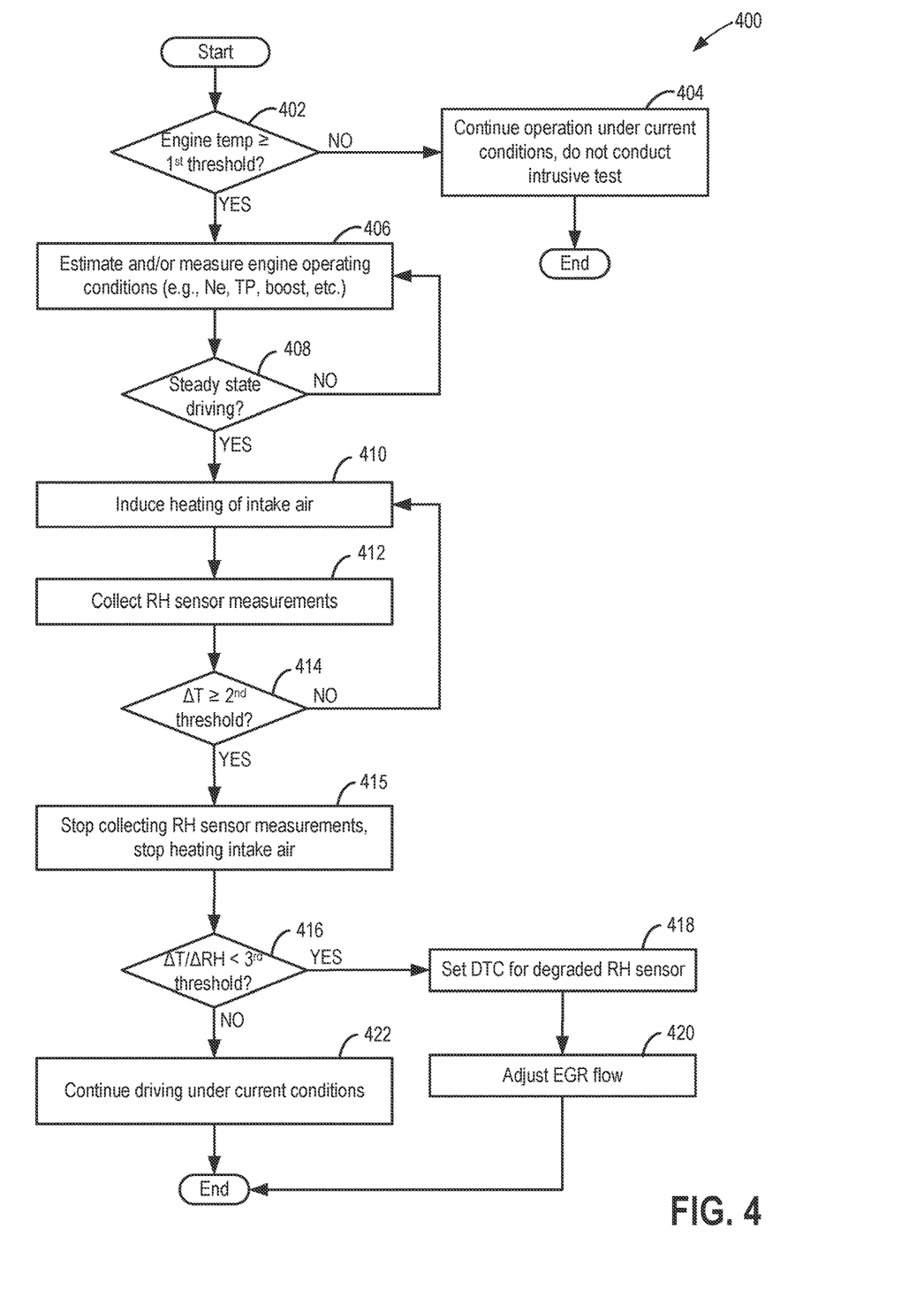
FIG. 4 shows an example of an intrusive method for assessing a status of the RH sensor.

FIGS. 4 and 5 show a first routine 400 and a second routine 500, respectively, for testing an integrity of a RH sensor, e.g., the RH sensor 55 of FIGS. 1 and 3, of a vehicle by inducing intake air heating using a heat recirculation system, such as the heat recirculation system 300 of FIG. 3. An engine of the vehicle may be on and operating (e.g., rotating and combusting fuel/air).

Monitoring of a condition of the RH sensor may be performed at regular, pre-set mileage increments, such as every 100 miles, or based on a time interval, such as every week. The RH sensor may be positioned in an intake passage of an engine system, downstream of a device for heating air flowing through the intake passage. In one example, the device may be an EGHX, such as the EGHX 153 of FIGS. 1 and 3, configured to circulate a coolant, such as water. The coolant may be circulated between the EGHX and at least one heat sink, such as the heat sink 302 of FIG. 3, where the heat sink is coupled to or at least in close proximity to an exhaust device to absorb heat from the exhaust device. A PCM may be incorporated in the heat sink, allowing storage of large quantities of heat which may be released rapidly during a phase transition of the PCM, as described above with reference to FIG. 3. The engine system may be further adapted with EGR, such as the HP-EGR system 157 shown in FIG. 1. Instructions for carrying out routines 400 and 500 may be executed by a controller, such as controller 12 of FIG. 1, based on instructions stored on a memory of the controller and in conjunction with signals received from sensors of the engine system, such as the sensors described above with reference to FIG. 1. The controller may employ engine actuators of the engine system to adjust engine operation, according to the methods described below.

Routine 400 depicts an intrusive method for testing the RH sensor. At 402, routine 400 includes determining if the engine temperature is at or above a first threshold. The first threshold may be a temperature, measured by a temperature sensor such as temperature sensor 116 of FIG. 1, that the engine reaches after continuous operation for several drive cycles, e.g., after the engine has warmed up to an optimal operating temperature. If the engine temperature is not above the first threshold, the routine proceeds to 404 to continue engine operation under the current conditions without conducting the intrusive test. The routine ends.

If the temperature at least reaches the first threshold, the routine continues to 406 to estimate and/or measure the current engine operating conditions. For example, engine speed may be determined based on a PIP signal from a Hall effect sensor, a throttle position may be detected by a throttle position sensor, boost may be measured based on an intake manifold pressure, specific humidity may be measured by an ambient humidity sensor, etc. The estimated/measured conditions are used to determine if the engine is operating under steady state conditions at 408. Steady state conditions may include, for example, fluctuations in engine speed within 50 rpm over 1 second, as well as variations in engine temperature, ambient temperature, and boost, within respective threshold ranges.

If steady state conditions are not confirmed, the routine returns to 406 to estimate/measure the current engine operating conditions. If steady state conditions are verified, the routine continues to 410 to induce heating of the intake air. The intake air may be heated using waste exhaust heat absorbed by the PCM and released during a phase transition of the PCM when the PCM is cooled. For example, as described above, a valve of the heat recirculation system, e.g., valve 306 of FIG. 3, may be initially closed, inhibiting coolant circulation through the heat recirculation system. The PCM arranged in the heat sink may absorb heat from the exhaust device during engine operation, causing the PCM to transition from a first phase (e.g., solid) to a second phase (e.g., liquid). Upon activation of the intrusive test, the valve may be opened, allowing the coolant to flow. Initially, cool coolant, e.g., cooler than a transition temperature (or melting point temperature) of the PCM, may flow across surfaces of the PCM, causing the PCM to transition from the second phase to the first phase. Heat is released from the PCM during the phase transition, thereby rapidly heating the coolant. At the EGHX, the heat is transferred from the coolant to intake air flowing across surfaces of the EGHX. Thus, the intake air is quickly heated.

At 412, data from the RH sensor is collected concurrent with the heating of the intake air. The routine includes determining if a change in temperature of the intake air is equal to or greater than a second threshold at 414. The second threshold may be an increase in temperature deemed sufficiently large to provide robust test results. For example, the increase in temperature may be large enough that ambient fluctuations in temperature and humidity have a minimal effect on the test results. If the change in temperature does not reach the second threshold, the routine returns to 410 to continue heating the intake air and collecting data from the RH sensor. If the change in temperature meets the second threshold, data collection from the RH sensor stops at 415. As data collection ends, the valve of the heat recirculation system is closed, halting flow of coolant through the heat recirculation system. The coolant in the EGHX quickly cools as intake air continues flowing into the intake passage.

In some examples, collection of data from the RH sensor may be terminated before the change in intake air temperature reaches the second threshold if the engine is detected to no longer be operating under steady state conditions. For example, a change in ambient temperature or ambient humidity beyond their respective threshold ranges may result in halting of the intrusive test. When data collection ends before the change in the intake air temperature reaches the second threshold, the routine may return to the start.

At 416, the routine includes determining if a ratio of the change in intake air temperature to a change in RH measured at the RH sensor is less than a third threshold. The third threshold may be a calibratable value dependent on a range of the RH sensor as well as on other flow operating conditions.

If the ratio is less than the third threshold, the RH sensor is deemed degraded and the routine proceeds to 418 to set a diagnostic trouble code (DTC) indicating the issue at the RH sensor. For example, a malfunction indicator lamp (MIL) may be illuminated on a vehicle dashboard to notify an operator of the DTC activation. In response to detection of the faulted RH sensor, the routine includes adjusting EGR flow at 420. The EGR flow may be adjusted by moderating an opening of an EGR valve, such as the EGR valve 163 of FIG. 1, to regulate EGR to the engine. As one example, the EGR flow may be adjusted based on an assumption of humidity reaching a maximum value. As such the EGR flow may be reduced to allow combustion at the engine to occur at higher temperatures to ensure vaporization of water. The routine ends.

If the ratio is equal to or greater than the third threshold, the routine proceeds to 422 to continue engine operation under the current operating conditions. The routine ends.

Turning now to FIG. 5, routine 500 depicts a non-intrusive method for testing the RH sensor. At 502, routine 500 includes estimating and/or measuring current engine operating conditions. For example, engine speed may be determined based on the PIP signal from the Hall effect sensor, specific humidity measured by the ambient humidity sensor, an ambient temperature detected at a temperature sensor, etc. The routine includes determining if the intake air heating is on at 504. The intake air may be heated during engine operation where an engine temperature is lower than a target temperature for optimal engine performance. As an example, intake air heating may be activated during cold engine starts. Heating the intake air may include, as described above, opening a valve of the heat recirculation system to allow heat absorbed by the heat sink to be circulated to the EGHX and transferred to the intake air. As such, determining that the intake air is being heated may include detecting that the valve is open.

If the intake air is not being heated, the routine proceeds to 506 to continue operating the engine under the current conditions. If the intake air is currently being heated, the routine continues to 508 to collect data from the RH sensor. At 510, the routine includes determining if the change in the intake air temperature reaches or surpasses a first threshold. The first threshold may be an increase in temperature deemed sufficiently large to provide robust test results. For example, the increase in temperature may be large enough that ambient fluctuations in temperature and humidity have a minimal effect on the test results.

If the change in the intake air temperature does not reach the first threshold, the routine returns to 508 to continue collecting data from the RH sensor. If the change in temperature meets the first threshold, the routine proceeds to 512 to stop collecting data from the RH sensor. In some examples, collection of data from the RH sensor may be terminated before the change in intake air temperature reaches the first threshold if heating of the intake air stops due to the engine reaching the target operating temperature. In one example, when data collection stops before the change in the intake air temperature reaches the first threshold, routine 500 may end and routine 400 may be conducted instead.

At 514, the routine includes determining if a ratio of the change in intake air temperature to a change in RH measured at the RH sensor is less than a second threshold. The second threshold may be a calibratable value dependent on a range of the RH sensor as well as on other flow operating conditions.

If the ratio is less than the second threshold, the RH sensor is deemed degraded and the routine proceeds to 516 to set a diagnostic trouble code (DTC) indicating the issue at the RH sensor. For example, a malfunction indicator lamp (MIL) may be illuminated on a vehicle dashboard to notify an operator of the DTC activation. In response to detection of the faulted RH sensor, the routine includes adjusting EGR flow at 518. The EGR flow may be modified by moderating an opening of the EGR valve to regulate EGR to the engine. As one example, the EGR flow may be adjusted based on an assumption of humidity reaching a maximum value. As such the EGR flow may be reduced to allow combustion at the engine to occur at higher temperatures to ensure vaporization of water. The routine ends.

If the ratio is equal to or greater than the second threshold, the routine proceeds to 520 to continue engine operation under the current operating conditions. The routine ends. It will be appreciated that the heating of the intake air as described in routines 400 and 500 may be accomplished using an intake air heater. Alternatively, if the intake air heater is not already provided in the vehicle, glow plugs may be installed to heat the intake air. Both methods of heating, however, rely on energization from an energy storage device, such as the vehicle battery, for activation. Furthermore, a prolonged period of time may be demanded by use of the intake air heater or glow plugs to provide a sufficiently large change in temperature to minimize noise in the RH measurements. Cooling of the electrical heating device subsequent to RH sensor testing may also be slow, increasing a likelihood that charge air becomes warmed. Thus, the heat recirculation system may present an energy efficient, fast alternative to electricity-based heating of the intake air.

Examples of engine operations and conditions during evaluation of an integrity of a RH sensor are depicted in graph 600 of FIG. 6. The RH sensor is included in an engine system such as the engine system 7 of FIG. 1, adapted with a heat recirculation system such as the heat recirculation system 300 of FIG. 3. An intrusive test may be conducted, as described with reference to FIG. 4, to monitor a response of the RH sensor to an induced increase in intake air temperature. Graph 600 includes plot 602 depicting a position of a heat recirculation system valve, the position alternating between an open and a closed position, plot 604 depicting engine speed, plot 606 illustrating intake air temperature, plot 608 showing a first set of relative humidity measurements, plot 610 showing a second set of relative humidity measurements, plot 612 illustrating a first measured EGR flow corresponding to plot 608, and plot 614 illustrating a second measured EGR flow corresponding to plot 610. Plot 606 is compared to a threshold temperature 616 which may be a threshold representing an increase in temperature, relative to an initial temperature, that is sufficient to evaluate the response of the RH sensor. Time is plotted along the x-axis of graph 600.

Prior to t1, the valve (plot 602) is closed. Engine speed (plot 604) is variable and intake air temperature (plot 606) is low (e.g., similar to ambient temperature). The relative humidity (plots 608 and 610) measurement reflects values corresponding to ambient humidity and EGR is flowing through an HP-EGR system. At t1, engine speed is determined to be stable and steady state engine operation is confirmed. Upon verifying steady state driving, EGR continues and the valve of the heat recirculation system is opened to allow coolant to flow through the heat recirculation system. As the coolant flows across a PCM, the PCM is cooled, releasing a large amount of heat and heating the coolant. The heated coolant flows to an EGHX and transfers the heat to the intake air.

Between t1 and t2, the intake air temperature rises. In a first scenario, the RH measurements at the RH sensor decrease, as shown in plot 608. At t2, the intake air temperature reaches the threshold 616 and the valve is closed.

A ratio of a change in the intake air temperature to a change in the RH readings is determined and compared to a threshold value. The ratio is determined to meet the threshold value, indicating that the RH sensor is intact. EGR is thus maintained. The intake air temperature cools after t2 and the RH readings return to the ambient reading.

In a second scenario, the RH measurements do not decrease, as shown at plot 610, instead remaining relatively uniform. At t2, the intake air temperature reaches the threshold 616 and the valve is closed. The ratio of the change in the intake air temperature to the change in the RH readings is determined and compared to the threshold value. The ratio does not reach the threshold value and degradation of the RH sensor is indicated. As a result, EGR flow is reduced to increase combustion temperature.

In this way, a condition of an RH sensor may be evaluated robustly without affecting a fuel economy of a vehicle. By implementing a heat recirculation system in the vehicle, the heat recirculation system including an EGHX fluidically coupled to one or more heat sinks by a coolant, waste heat may be recuperated from an exhaust system when the heat sinks are coupled to exhaust devices of the vehicle. The heat sinks may include a PCM with a large latent heat which releases heat to the coolant when the coolant is circulated through the heat recirculation system. The heat is transferred to intake air at the EGHX, thereby rapidly heating the air over a large heat threshold. The fast heating and large increase in temperature reduces a time to complete testing, decreases an effect of environmental noise on RH measurements, and allows a tighter threshold to be calibrated. As a result, EGR flow to the engine may be adjusted according to a status of the RH sensor to maintain stable combustion.

A technical effect of utilizing the heat recirculation system, including a PCM to release large quantities of heat, is that a response of the RH sensor to an increase in intake air temperature can be robustly evaluated for degradation.

The disclosure also provides support for a method comprising: heating intake air entering an intake passage of an engine using heat recirculated from an exhaust system of the engine to diagnose a status of a relative humidity (RH) sensor positioned in the intake passage. In a first example of the method, recirculating the heat from the exhaust system includes arranging a heat sink at an exhaust device of the exhaust system and wherein the heat sink is configured with a phase change material (PCM). In a second example of the method, optionally including the first example, recirculating the heat from the exhaust system further includes fluidically coupling the heat sink to a heat exchanger arranged in the intake passage, upstream of the RH sensor. In a third example of the method, optionally including the first and second examples, heating the intake air includes inducing a phase transition of the PCM to transfer stored heat from the PCM to a coolant circulating between the heat exchanger and the heat sink. In a fourth example of the method, optionally including the first through third examples, inducing the phase transition includes cooling the PCM to transition the PCM from a first phase to a second phase to release the stored heat and wherein the stored heat is heat absorbed by the PCM from the exhaust device during engine operation. In a fifth example of the method, optionally including the first through fourth examples, diagnosing the RH sensor includes monitoring a response of the RH sensor to the heating of the intake air to determine if the RH sensor is degraded. In a sixth example of the method, optionally including the first through fifth examples, arranging the heat sink at the exhaust device includes positioning the heat sink in contact with one of an emission control device, a particulate filter, an exhaust gas recovery unit, and a muffler, and wherein recirculating heat from the exhaust system includes arranging additional heat sinks at other exhaust devices of the exhaust system, the additional heat sinks also fluidically coupled to the heat exchanger.

The disclosure also provides support for a method for testing an integrity of a relative humidity (RH) sensor, comprising: heating a coolant using heat released from a phase change material (PCM), the PCM configured to absorb heat from exhaust devices of an engine, transferring the released heat from the coolant to intake air at an exhaust gas heat exchanger (EGHX), collecting RH measurements from the RH sensor as the heat is transferred to the intake air, and determining a ratio of a change in intake air temperature to a change in the RH measurements and comparing the ratio to a threshold ratio to determine a condition of the RH sensor. In a first example of the method, releasing the heat from the PCM includes opening a valve to allow coolant to flow across surfaces of the PCM and wherein the the coolant is cooler than the PCM and causes the PCM to transition from a first phase to a second phase. In a second example of the method, optionally including the first example, transferring the released heat from the coolant to the intake air includes heating the intake air by flowing the intake air across surfaces of the EGHX and wherein the EGHX is configured to receive the coolant from heat sinks adapted with the PCM and in contact with the exhaust devices. In a third example of the method, optionally including the first and second examples, collecting the RH measurements includes obtaining data from the RH sensor until the change in the intake air temperature reaches a threshold change in temperature. In a fourth example of the method, optionally including the first through third examples, the method further comprises: halting a flow of the coolant upon reaching the threshold change in temperature and terminating heating of the intake air by halting the flow. In a fifth example of the method, optionally including the first through fourth examples, the RH sensor is deemed degraded when the ratio of the change in the intake air temperature to the change in the RH measurements is less than the threshold ratio. In a sixth example of the method, optionally including the first through fifth examples, the method further comprises: reducing EGR flow when the RH sensor is deemed degraded. In a seventh example of the method, optionally including the first through sixth examples, heating the intake air includes opening the valve when the engine is operating in a steady state and collecting the RH measurements upon opening the valve. In an eighth example of the method, optionally including the first through seventh examples, collecting the RH measurements includes obtaining data from the RH sensor while the intake air is heated to increase engine intake temperature.

The disclosure also provides support for an engine system, comprising: a relative humidity (RH) sensor positioned in an intake passage of the engine system, a heat exchanger arranged upstream of the RH sensor in the intake passage and in a path of intake air drawn into the intake passage, a heat sink in contact with an exhaust device of the engine system and fluidically coupled to the heat exchanger by coolant lines circulating a coolant between the heat exchanger and the heat sink, and a phase change material (PCM) arranged in the heat sink, the PCM configured to release heat during a phase transition induced by a change in temperature, wherein the released heat is transferred to the intake air via the coolant at the heat exchanger and an integrity of the RH sensor is diagnosed based on a response of the RH sensor to a heating of the intake air. In a first example of the system, the PCM has a phase transition temperature similar to an operating temperature of the exhaust device and wherein the PCM is configured to absorb heat from the exhaust device and store the heat as the PCM transitions from a first phase to a second phase. In a second example of the system, optionally including the first example, the phase transition induced by the change in temperature is a phase change of the PCM from the second phase to the first phase caused by flowing cool coolant across the PCM. In a third example of the system, optionally including the first and second examples, the system further comprises: an intake air heater or one or more glow plugs arranged in the intake passage, the intake air heater and the one or more glow plugs also configured to heat the intake air.

In another representation, a method includes heating intake air by one of an intake air heater, a glow plug, and a heat recirculation system to diagnose a condition of a humidity sensor configured to measure a humidity of the intake air. In a first example of the method, the condition of the humidity sensor is diagnosed when the intake air is heated to warm an engine. A second example of the method optionally includes the first example, and further includes, wherein heating the intake air is induced when the engine is operated in a steady state mode. A third example of the method optionally includes one or more of the first and second examples, and further includes activating the heat recirculation system based on adjustment of a valve of the heat recirculation system, the valve control flow of coolant. A fourth example of the method optionally includes one or more of the first through third examples, and further includes, wherein heating the intake air via the heat recirculation system is faster than heating the intake air via the intake air heater or the glow plug. A fifth example of the method optionally includes one or more of the first through fourth examples, and further includes, wherein heating the intake air via the heat recirculation system induces a larger change in intake air temperature than heating the intake air via the intake air heater or the glow plug.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
adjusting a position of a valve via a controller to heat intake air entering an intake passage of an engine using heat recirculated from an exhaust system of the engine while collecting relative humidity (RH) measurements via an RH sensor and the controller to diagnose a status of the relative humidity (RH) sensor positioned in the intake passage.

2. The method of claim 1, wherein recirculating the heat from the exhaust system includes arranging a heat sink at an exhaust device of the exhaust system and wherein the heat sink is configured with a phase change material (PCM).

3. The method of claim 2, wherein recirculating the heat from the exhaust system further includes fluidically coupling the heat sink to a heat exchanger arranged in the intake passage, upstream of the RH sensor.

4. The method of claim 3, wherein heating the intake air includes inducing a phase transition of the PCM to transfer stored heat from the PCM to a coolant circulating between the heat exchanger and the heat sink.

5. The method of claim 4, wherein inducing the phase transition includes cooling the PCM to transition the PCM from a first phase to a second phase to release the stored heat and wherein the stored heat is heat absorbed by the PCM from the exhaust device during engine operation.

6. The method of claim 5, wherein diagnosing the RH sensor includes monitoring a response of the RH sensor to the heating of the intake air to determine if the RH sensor is degraded.

7. The method of claim 3, wherein arranging the heat sink at the exhaust device includes positioning the heat sink in contact with one of an emission control device, a particulate filter, an exhaust gas recovery unit, and a muffler, and wherein recirculating heat from the exhaust system includes arranging additional heat sinks at other exhaust devices of the exhaust system, the additional heat sinks also fluidically coupled to the heat exchanger.

8. A method for testing an integrity of a relative humidity (RH) sensor, comprising:
adjusting a position of a valve via a controller to heat a coolant using heat released from a phase change material (PCM), the PCM configured to absorb heat from exhaust devices of an engine;
transferring the released heat from the coolant to intake air at an exhaust gas heat exchanger (EGHX);
collecting RH measurements from the RH sensor via the controller as the heat is transferred to the intake air; and
determining a ratio of a change in intake air temperature to a change in the RH measurements via the controller and comparing the ratio to a threshold ratio to determine a condition of the RH sensor via the controller.

9. The method of claim 8, wherein releasing the heat from the PCM includes opening a valve to allow coolant to flow across surfaces of the PCM and wherein the coolant is cooler than the PCM and causes the PCM to transition from a first phase to a second phase.

10. The method of claim 8, wherein transferring the released heat from the coolant to the intake air includes heating the intake air by flowing the intake air across surfaces of the EGHX and wherein the EGHX is configured to receive the coolant from heat sinks adapted with the PCM and in contact with the exhaust devices.

11. The method of claim 10, wherein heating the intake air includes opening the valve when the engine is operating in a steady state and collecting the RH measurements upon opening the valve.

12. The method of claim 10, wherein collecting the RH measurements includes obtaining data from the RH sensor while the intake air is heated to increase engine intake temperature.

13. The method of claim 8, wherein collecting the RH measurements includes obtaining data from the RH sensor until the change in the intake air temperature reaches a threshold change in temperature.

14. The method of claim 13, further comprising halting a flow of the coolant upon reaching the threshold change in temperature and terminating heating of the intake air by halting the flow.

15. The method of claim 8, wherein the RH sensor is deemed degraded when the ratio of the change in the intake air temperature to the change in the RH measurements is less than the threshold ratio.

16. The method of claim 15, further comprising reducing EGR flow when the RH sensor is deemed degraded.

17. An engine system, comprising:
a relative humidity (RH) sensor positioned in an intake passage of the engine system;
a heat exchanger arranged upstream of the RH sensor in the intake passage and in a path of intake air drawn into the intake passage;
a heat sink in contact with an exhaust device of the engine system and fluidically coupled to the heat exchanger by coolant lines circulating a coolant between the heat exchanger and the heat sink; and
a phase change material (PCM) arranged in the heat sink, the PCM configured to release heat during a phase transition induced by a change in temperature;
wherein the released heat is transferred to the intake air via the coolant at the heat exchanger and an integrity of the RH sensor is diagnosed based on a response of the RH sensor while heating the intake air.

18. The engine system of claim 17, wherein the PCM has a phase transition temperature similar to an operating temperature of the exhaust device and wherein the PCM is configured to absorb heat from the exhaust device and store the heat as the PCM transitions from a first phase to a second phase.

19. The engine system of claim 18, wherein the phase transition induced by the change in temperature is a phase change of the PCM from the second phase to the first phase caused by flowing cool coolant across the PCM.

20. The engine system of claim 17, further comprising an intake air heater or one or more glow plugs arranged in the intake passage, the intake air heater and the one or more glow plugs also configured to heat the intake air.

* * * * *